(12) United States Patent
Vacher

(10) Patent No.: US 8,332,989 B2
(45) Date of Patent: Dec. 18, 2012

(54) ADAPTER FOR FIXING A WINDSCREEN WIPER BLADE TO AN ARM

(75) Inventor: Pascal Vacher, Issoire (FR)

(73) Assignee: Valeo Systémes d'Essuyage, Le Mesnil-Saint-Denis (FR)

( * ) Notice: Subject to any disclaimer, the term of this patent is extended or adjusted under 35 U.S.C. 154(b) by 215 days.

(21) Appl. No.: 11/926,904

(22) Filed: Oct. 29, 2007

(65) Prior Publication Data

US 2008/0066254 A1    Mar. 20, 2008

Related U.S. Application Data

(63) Continuation of application No. 10/527,223, filed as application No. PCT/EP03/09950 on Sep. 8, 2003, now Pat. No. 7,287,296.

(30) Foreign Application Priority Data

Sep. 12, 2002  (FR) ..................................... 02 11405

(51) Int. Cl.
*B60S 1/40* (2006.01)
(52) U.S. Cl. .............. 15/250.32; 15/250.351; 15/250.43
(58) Field of Classification Search ............. 15/250.351, 15/250.32, 250.361; 403/321, 326, 322.4; D12/220
See application file for complete search history.

(56) References Cited

U.S. PATENT DOCUMENTS

| 2,861,290 | A |   | 11/1958 | Hoyler |           |
|-----------|---|---|---------|--------|-----------|
| 3,049,743 | A | * | 8/1962  | Graczyk et. al. | 15/250.32 |
| 3,056,160 | A |   | 10/1962 | Oishei et al. |   |
| 3,082,463 | A | * | 3/1963  | Bock et. al. | 15/250.32 |
| 3,550,180 | A | * | 12/1970 | Arman  | 15/250.32 |
| 3,593,362 | A | * | 7/1971  | Arman  | 15/250.32 |
| 3,629,897 | A | * | 12/1971 | Arman  | 15/250.32 |
| 3,657,762 | A | * | 4/1972  | Arman  | 15/250.32 |
| 3,768,113 | A | * | 10/1973 | Kolb   | 15/250.32 |

(Continued)

FOREIGN PATENT DOCUMENTS

DE           1048170 B       12/1958

(Continued)

OTHER PUBLICATIONS

International Search Report for PCT/EP03/09950 mailed Dec. 4, 2003, 2 pages.

(Continued)

*Primary Examiner* — Gary Graham
(74) *Attorney, Agent, or Firm* — Osha Liang LLP

(57) ABSTRACT

An adapter intended for fixing a windscreen wiper blade, by pivoting connection around a spindle, on an arm comprising an end rod designed to be inserted in the adapter, where the adapter is intended to be mounted on the windscreen wiper blade. The adapter has a substantially U-shaped cross-section in which the flanges each have an orifice for snapping onto the said spindle and one end of which, called the entry end, is open for inserting the end rod of the arm. The adapter includes transverse locking means and longitudinal locking means of the said arm. The adapter further includes a first longitudinal locking means including an articulated part provided with a tenon fitted in an orifice arranged on the rod, and a second longitudinal locking means including a housing arranged on the adapter in which a stop on the rod comes into engagement, when the latter is fitted.

13 Claims, 4 Drawing Sheets

U.S. PATENT DOCUMENTS

| | | | | |
|---|---|---|---|---|
| 3,780,394 A | * | 12/1973 | Quinlan et al. | 15/250.32 |
| 3,831,222 A | * | 8/1974 | Kushida | 15/250.32 |
| 3,849,829 A | | 11/1974 | Wubbe | |
| 3,900,916 A | | 8/1975 | Wubbe | |
| 3,900,917 A | * | 8/1975 | Baut et al. | 15/250.32 |
| 4,094,039 A | | 6/1978 | Waterman et al. | |
| 4,321,725 A | * | 3/1982 | Journee | 15/250.32 |
| 4,370,775 A | | 2/1983 | van den Berg et al. | |
| 5,168,597 A | | 12/1992 | Schon et al. | |
| 5,606,765 A | * | 3/1997 | Ding | 15/250.32 |
| 5,611,103 A | * | 3/1997 | Lee | 15/250.32 |
| 5,807,016 A | | 9/1998 | Herring et al. | |
| 6,192,546 B1 | | 2/2001 | Kotlarski | |
| 6,397,428 B2 | | 6/2002 | Kotlarski | |
| 6,779,223 B1 | | 8/2004 | Roekens | |
| 6,966,096 B2 | | 11/2005 | Baseotto et al. | |
| 7,143,463 B2 | | 12/2006 | Baseotto et al. | |
| 7,287,296 B2 | * | 10/2007 | Vacher | 15/250.32 |
| 7,581,279 B2 | | 9/2009 | Baseotto et al. | |

FOREIGN PATENT DOCUMENTS

| | | | | |
|---|---|---|---|---|
| DE | 1058382 | * | 5/1959 | |
| DE | 1108580 | * | 6/1961 | |
| DE | 77904 | B | 11/1970 | |
| EP | 0300802 | A1 | 1/1989 | |
| EP | 0455520 | A1 | 11/1991 | |
| EP | 0841229 | A1 | 5/1998 | |
| EP | 0895907 | A1 | 2/1999 | |
| FR | 2070567 | A | 8/1971 | |
| FR | 2070567 | * | 9/1971 | |
| FR | 2109834 | A5 | 5/1972 | |
| FR | 2205021 | A5 | 5/1974 | |
| FR | 2467118 | A1 | 4/1981 | |
| FR | 2480214 | A1 | 10/1981 | |
| FR | 2659614 | A1 | 9/1991 | |
| FR | 2738201 | A1 | 3/1997 | |
| FR | 2767103 | A1 | 2/1999 | |
| GB | 615500 | A | 1/1949 | |
| GB | 632981 | A | 12/1949 | |
| GB | 813090 | A | 5/1959 | |
| GB | 941775 | A | 11/1963 | |
| GB | 1354870 | A | 6/1974 | |
| GB | 1368760 | A | 10/1974 | |
| GB | 2034580 | | * | 6/1980 |
| GB | 2034580 | A | 6/1980 | |
| GB | 2207041 | A | 1/1989 | |
| JP | 49094029 | A | 9/1974 | |
| JP | 50-26528 | | 3/1975 | |
| JP | 62-163168 | | 10/1987 | |
| WO | 01/15946 | A1 | 3/2001 | |
| WO | 02/34595 | A1 | 5/2002 | |
| WO | 02/40328 | A1 | 5/2002 | |

OTHER PUBLICATIONS

Opposition to European Patent No. 1 884 425 (14 pages).
Notice of Opposition to a European Patent No. 1884425, Sep. 21, 2009 (5 pages).
Notice of Opposition to a European Patent No. 1884425, Dec. 15, 2009 (21 pages).
Grounds of Opposition Concerning European Patent No. 1884425, Sep. 21, 2009 (5 pages).
Champion Brochure, 1999.

* cited by examiner

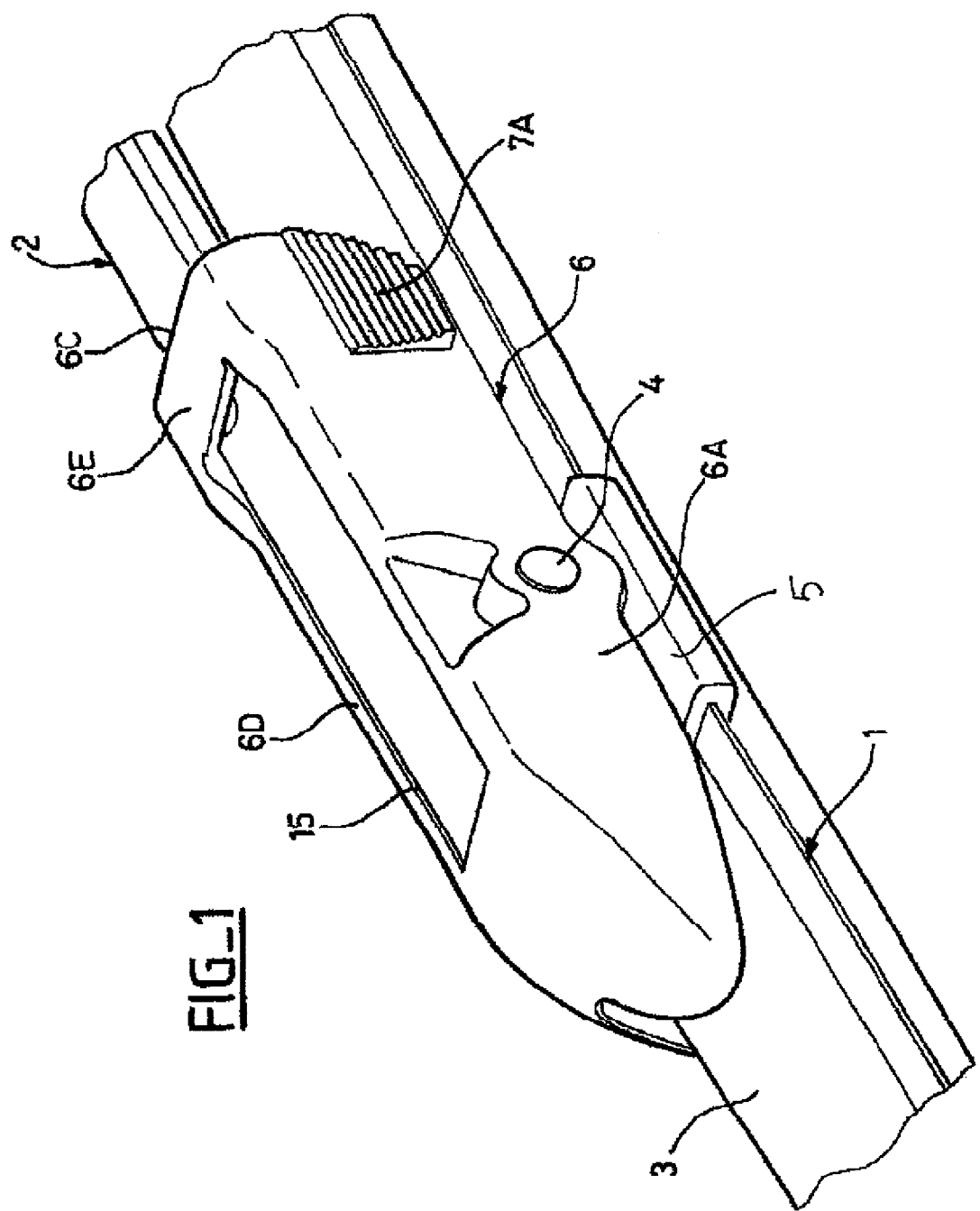
FIG_1

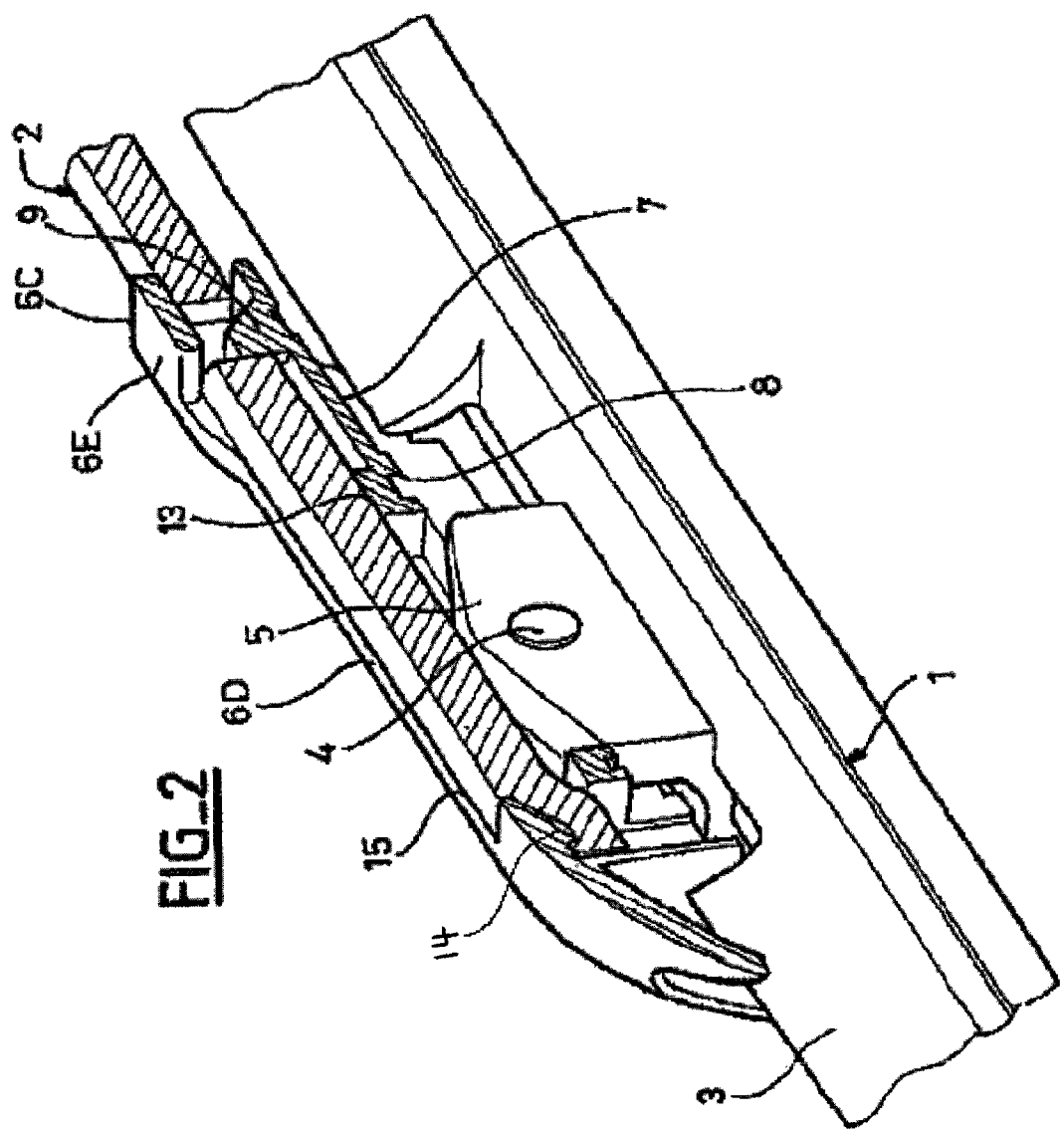
FIG_2

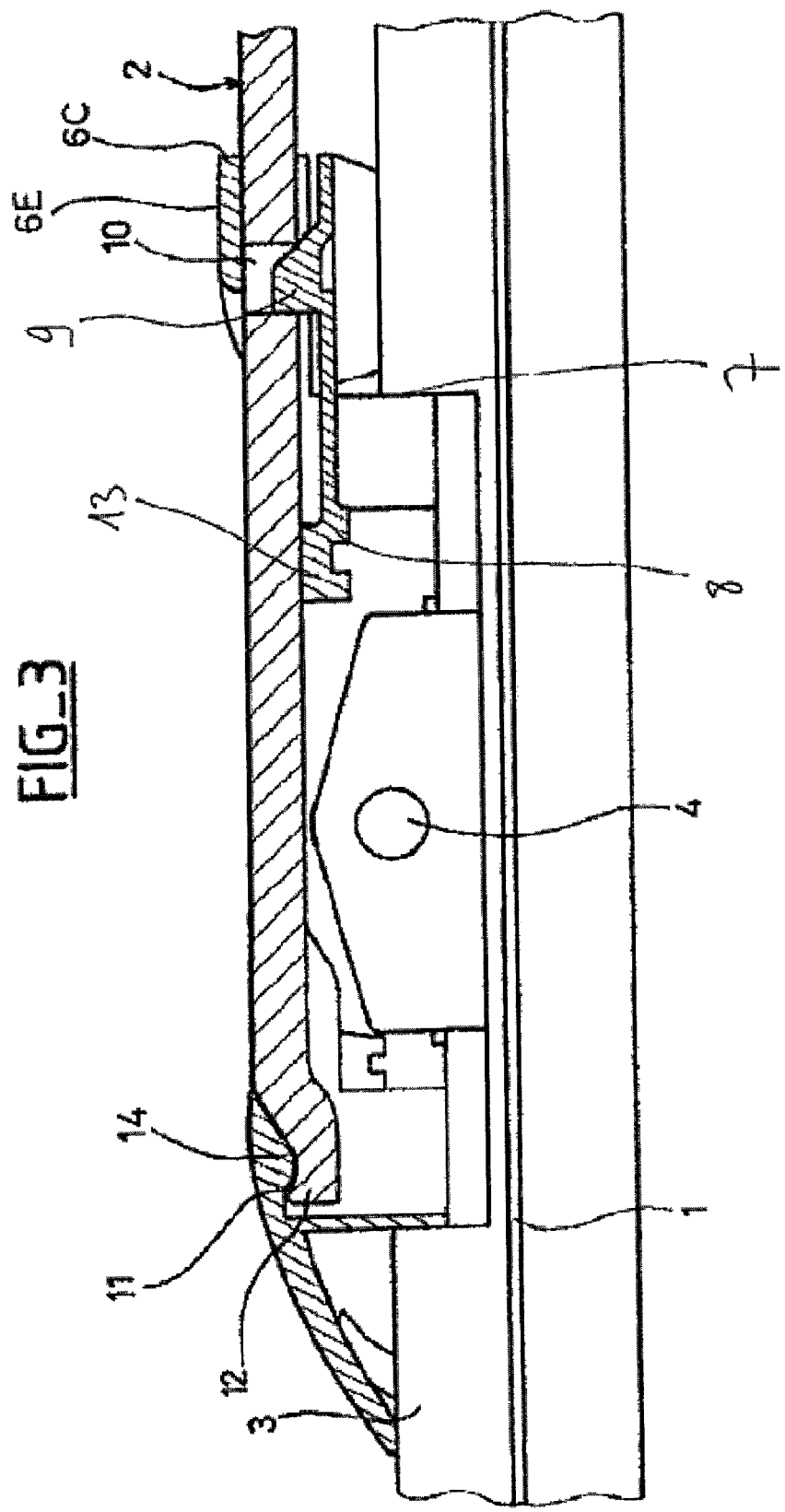

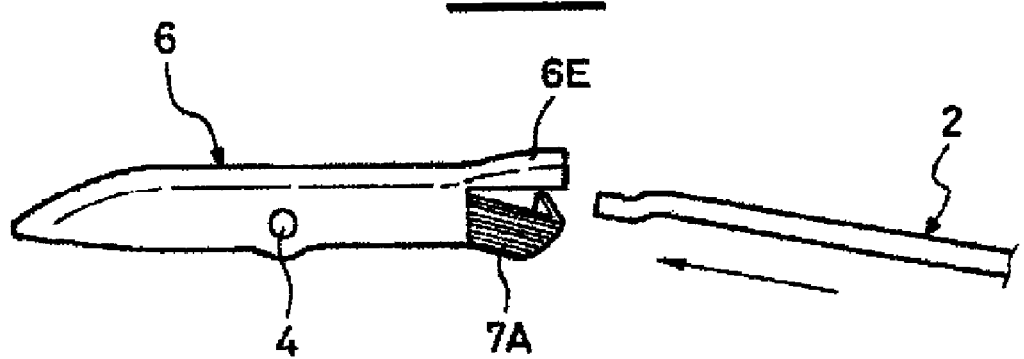
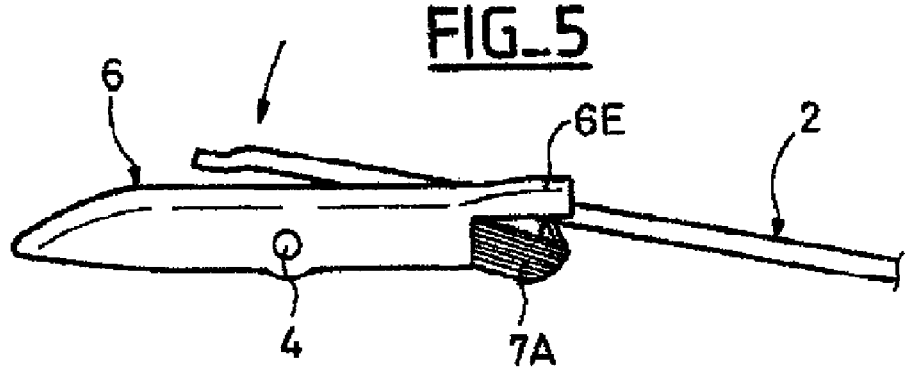
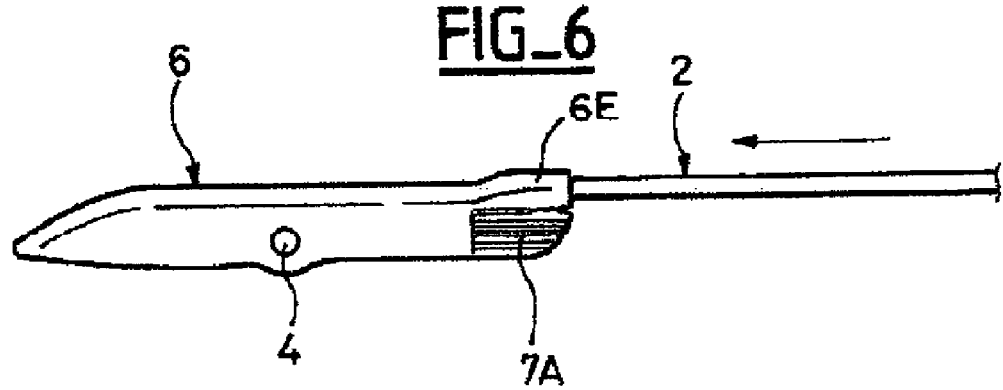

ADAPTER FOR FIXING A WINDSCREEN WIPER BLADE TO AN ARM

CROSS-REFERENCE TO RELATED APPLICATIONS

This application is a continuation application of U.S. application Ser. No. 10/527,223 entitled "Arrangement for Fixing a Windscreen Wiper Blade to a Wiper Arm," filed on Mar. 10, 2005, in the name of Pascal Vacher.

FIELD OF THE INVENTION

The present invention relates to an adapter for fixing a windscreen wiper blade to an arm. It also relates to a windscreen wiper arm having such an adapter as well as an arrangement for fixing a windscreen wiper blade equipped with such an adapter to an arm. It concerns more precisely an arrangement for fixing a windscreen wiper blade to an arm, this blade having a transverse pivot spindle intended for pivoting connection with the arm.

BACKGROUND

In a known fashion, such a blade is adapted to a specific type of arm referred to as the yoke type as it has an end with a U-shaped profile made from steel sheet produced by rolling around the arm. According to a known embodiment, an independent piece called an adapter is mounted on the blade, this adapter being provided with facing orifices on its flanges and intended to be snapped onto the spindle and the end of the U-shaped arm is fitted and locked on this adapter, the opening of the U being directed towards the blade. However, these yoke arms are complex and expensive with regard to their manufacture.

To resolve this problem and to allow the mounting of arms with a particularly simple design consisting of arms with an end rod, the invention proposes an adapter for fixing a windscreen wiper blade, by pivoting connection around a spindle, on an arm having the characteristics of claim 1.

SUMMARY OF THE INVENTION

The proposed adapter has, in a conventional manner, a U-shaped cross-section whose flanges each have an orifice for snapping onto the spindle and an end of which, referred to as the entry end, is open, and the adapter has means for the transverse and longitudinal locking of the arm.

According to the invention, the adapter has first longitudinal locking means and second longitudinal locking means of the arm in the adapter. The use of these first and second longitudinal locking means provides reinforced security in the connection between the windscreen wiper blade and the windscreen wiper arm.

According to the invention, the first longitudinal locking means consists of an articulated part provided with a tenon fitted in an orifice arranged on the rod, when the latter is fitted.

In this case, preferably, this locking means consists of a cross-member articulated on the adapter, forming with the web of the adapter, at its entry end, a channel for positioning the rod.

According to the invention, the second longitudinal locking means consists of a housing arranged on the adapter in which a stop on the rod comes into engagement, when the latter is fitted.

In this case, preferably, the said housing is arranged on the web of the adapter close to its end opposite to the entry end and the said stop is arranged at the end of the rod.

The housing can be conformed by virtue of a profiled snapping-in rib on the internal surface of the adapter and the stop can be a profiled catch at the end of the rod.

In addition, preferably, the adapter comprises at least one fixed cross-member for the transverse locking of the rod.

Preferably, the web of the adapter is provided with a longitudinal opening allowing passage of the rod while it is fitted.

The invention also concerns a fixing arrangement and a windscreen wiper arm having such an adapter.

The invention is described below in more detail with the help of the figures showing a possible embodiment of the invention.

BRIEF DESCRIPTION OF THE DRAWINGS

FIG. 1 is a perspective view of the fixing arrangement according to embodiments of the invention.

FIG. 2 is a similar perspective view in longitudinal section according to embodiments of the invention.

FIG. 3 is a view in longitudinal section of the fixing arrangement according to embodiments of the invention.

FIGS. 4-6 are front views illustrating the fitting of the arm rod according to embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The adapter according to the invention is depicted in FIGS. 1 to 3.

An arm 2 is mounted on a blade (1, 3, 5, 4). This arm 2, connected in a known fashion to a rotation drive, allows the movement of the blade on the window of a car, in particular. This blade (1, 3, 5, 4) is of a known type and has a through transverse pivot spindle 4 fixed to a piece 5 integral with the pieces 1 and 3 consisting of the rubber blade and its reinforcement vertebrae. Such a blade is, in a known manner, intended to receive an independent piece called an adapter, on which an arm with a yoke is fitted.

The invention makes it possible to mount an end rod as an arm for fitting in an adapter 6.

To do this, the plastic adapter 6 is a piece with a U-shaped cross-section whose flanges 6A, 6B each have an orifice for snapping onto the spindle 4 and whose end 6C, referred to as the entry end, is open. This entry end 6C is intended to receive the end rod of the arm 2.

The adapter 6 also has means for the transverse and longitudinal locking of the fitted arm.

A first longitudinal locking means consists of an articulated part consisting of a cross-member 7 articulated on the adapter by at least one flexible tongue 8 and carrying a tenon 9. As will be described below more precisely, this tenon 9 is fitted in an orifice 10 arranged on the rod 2 when the latter is fitted. This cross-member 7 forms with the web 6D of the adapter at its entry end 6C a channel for positioning the rod.

A second longitudinal locking means consists of a housing 11 arranged on the internal surface of the web 6D of the adapter and in which a stop 12 on the rod engages, when the latter is fitted. This housing 11 is arranged close to the end opposite to the entry end 6C and this stop 12 is arranged at the end of the rod of the arm 2. Advantageously, this housing 11 is conformed by virtue of a profiled snapping-in rib 14 and the stop 12 is a profiled catch at the end of the rod.

The adapter also has at least one fixed cross-member 13 for transverse locking of the rod. This cross-member 13 is arranged at a free position between the two ends of the adapter, having regard to the size of the piece 5 supporting the spindle 4.

The web 6D of the adapter is provided with a longitudinal opening 15 allowing the passage and fitting of the rod when it is slipped in, as will now be described with reference to FIGS. 4 to 6.

The adapter 6 is mounted on the arm 2 after it is fitted on the spindle 4. To do this, as depicted in FIG. 4, the positioning channel formed by the cross-member 7 and the web 6D of the adapter is opened by moving the cross-member 7 downwards (looking at the figure) by virtue of the elastic deformation of the tongue 8. To assist this manipulation, the flanks of the cross-member 7 are provided with gripping ribs 7A.

With its end inclined upwards (looking at the figure), the end of the rod of the arm 2 is introduced into this channel over a certain length and passes into the longitudinal opening 15. Thus, the rod is easily slipped above the fixed cross-member 13. When the end of the rod is close to the end of the opening 15 opposite to the entry opening 6C, as depicted in FIG. 5, the rod is folded towards the inside of the adapter.

It then suffices to push it longitudinally, as depicted in FIG. 6, in order to snap its stop 12 into the housing 11 of the adapter.

Advantageously, the rod of the arm 2 and the adapter 6 are profiled so that the slipped-in rod fits flush with the external surface of the web 6D level with the longitudinal opening 15 of the web 6D of the adapter, for aerodynamic, aesthetic and size reasons. The rod is therefore non-rectilinear, with an inclined shape at its end in order to be housed under the web 6D of the adapter. For its part, the adapter is raised close to its entry opening 6C, where it forms a bridge 6E between the entry opening 6C and the longitudinal opening 15.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An adapter configured to connect a windscreen wiper blade, by pivoting connection around a spindle, on an arm having an end rod, the end rod being configured to fit in the adapter, wherein:
   the adapter is mounted on the blade, wherein the adapter is configured to receive the end of the arm,
   the adapter has a substantially U-shaped cross section and comprises flanges, each of which have an orifice for snapping onto the spindle, wherein an entry end of the adapter is open and configured to receive the end rod of the arm, and
   the adapter comprises means for longitudinal locking of the said arm,
   wherein the longitudinal locking means comprises:
   a first longitudinal locking means comprising a cross-member articulated on the adapter by at least one elastically deformable flexible tongue configured to carry a tenon fitted in an orifice arranged on the end rod, when the end rod is fitted; and
   a second longitudinal locking means comprising a housing arranged on the adapter in which a stop on the rod comes into locking engagement, when the rod is fitted,
   wherein the orifice of the flanges is located between the first longitudinal locking means and the second longitudinal locking means, and
   wherein each of the first longitudinal locking means and the second longitudinal locking means independently provides reinforced security in the connection between the windscreen wiper blade and the arm.

2. The adapter of claim 1, wherein the at least one flexible tongue forms, with a web of the adapter at its entry end, a positioning channel for the rod, and wherein the web of the adapter is provided with a longitudinal opening allowing the passage and fitting of the rod into the adapter.

3. The adapter of claim 2, wherein the positioning channel formed by the cross-member and the web of the adapter is opened by moving the cross-member downwards.

4. The adapter of claim 1, wherein the cross-member comprises flanks, wherein the flanks are provided with gripping ribs used to assist in opening the positioning channel.

5. The adapter of claim 1, wherein the housing of the second locking means is arranged on an internal surface of a web of the adapter close to an end of the adapter opposite to the entry end and the stop is arranged at the end of the rod.

6. The adapter of claim 1, wherein said housing comprises a profiled snapping-in rib formed on an internal surface of the adapter and is configured to engage with a profiled catch at the end of the rod.

7. The adapter of claim 1, wherein the adapter has at least one fixed cross-member forming transverse locking means of the rod.

8. The adapter of claim 7, wherein the at least one fixed cross-member is arranged in a free space between the two ends of the adapter.

9. A windscreen wiper arm mounted on an adapter as claimed in claim 1.

10. An arrangement for fixing a windscreen wiper blade on an arm, wherein the arrangement comprises an adapter according to claim 1.

11. An adapter configured to connect a windscreen wiper blade, by pivoting connection around a spindle, on an arm having an end rod, the end rod configured to fit in the adapter, wherein:
   the adapter is mounted on the said blade;
   the adapter has a substantially U-shaped cross section and comprises flanges, each of which have an orifice for snapping onto the spindle, wherein an entry end of the adapter is open and configured to receive the end rod of the arm, and
   the adapter comprises means for transverse locking and means for longitudinal locking of the said arm,
   wherein the longitudinal locking means comprises:
   a first longitudinal locking means comprising a first cross-member articulated on the adapter by at least one elastically deformable flexible tongue configured to carry a tenon fitted in an orifice arranged on the end rod, when end rod is fitted;
   a second longitudinal locking means consisting of a housing comprising a profiled snapping-in rib on an internal surface of the adapter which engages with a profile catch on the end of the rod, when the rod is fitted, wherein the orifice of the flanges is located between the first longitudinal locking means and the second longitudinal locking means, and wherein each of the first longitudinal locking means and the second longitudinal locking means independently provides reinforced security in the connection between the windscreen wiper blade and the arm; and wherein at least one fixed second cross-member forms the transversal locking means of the rod.

12. An adapter configured to connect a windscreen wiper blade, by pivoting connection around a spindle, on an arm having an end rod, the end rod being configured to fit in the adapter, wherein:

the adapter is mounted on the blade, the adapter has a substantially U-shaped cross section and comprises flanges, each of which have an orifice for snapping onto the spindle, wherein an entry end of the adapter is open and configured to receive the end rod of the arm, and the adapter comprises means for longitudinal locking of the said arm, wherein the longitudinal locking means comprises:

a first longitudinal locking means comprising a cross-member articulated on the adapter by at least one elastically deformable flexible tongue configured to carry a tenon fitted in an orifice arranged on the end rod, when the end rod is fitted; and a second longitudinal locking means comprising a housing arranged on the adapter in which a stop on the rod comes into frictional engagement, when the rod is fitted, wherein the orifice of the flanges is located between the first longitudinal locking means and the second longitudinal locking means, and wherein each of the first longitudinal locking means and the second longitudinal locking means independently provides reinforced security in the connection between the windscreen wiper blade and the arm.

13. An apparatus comprising an adapter configured to connect a windscreen wiper blade, by pivoting connection around a spindle, and an arm having an end rod fitted in the adapter, wherein:

the arm has an orifice arrange in the end rod and an inclined shape at its end, the adapter has a substantially U-shaped cross section and comprises flanges, each of which have an orifice for snapping onto the spindle, wherein an entry end of the adapter is open and configured to receive the end rod of the arm, and the adapter comprises means for longitudinal locking of the said arm, wherein the longitudinal locking means comprises:

a first longitudinal locking means comprising a cross member articulated on the adapter by at least one elastically deformable flexible tongue to carry a tenon, a second longitudinal locking means comprising a housing arranged on the adapter, wherein the orifice of the flanges is located between the first longitudinal locking means and the second longitudinal locking means, and wherein the orifice of the end rod of the arm is fitted in the tenon of the adapter and wherein the inclined shape of the arm is fitted in the housing of the adapter in order to secure the connection between the arm and the adapter.

* * * * *